United States Patent
Michel et al.

(10) Patent No.: US 12,442,201 B2
(45) Date of Patent: Oct. 14, 2025

(54) DEVICE FOR PREPARING AN INSULATION PRODUCT MADE FROM WOOL, IN PARTICULAR MINERAL WOOL

(71) Applicant: SAINT-GOBAIN ISOVER, Courbevoie (FR)

(72) Inventors: Alexia Michel, Paris (FR); David Luis, Breuil le Vert (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 598 days.

(21) Appl. No.: 17/787,167

(22) PCT Filed: Dec. 18, 2020

(86) PCT No.: PCT/FR2020/052551
§ 371 (c)(1),
(2) Date: Jun. 17, 2022

(87) PCT Pub. No.: WO2021/123679
PCT Pub. Date: Jun. 24, 2021

(65) Prior Publication Data
US 2023/0020345 A1    Jan. 19, 2023

(30) Foreign Application Priority Data
Dec. 20, 2019   (FR) ...................................... 1915097

(51) Int. Cl.
*E04F 21/12*   (2006.01)
*B05B 7/14*   (2006.01)

(52) U.S. Cl.
CPC ............ *E04F 21/12* (2013.01); *B05B 7/1404* (2013.01)

(58) Field of Classification Search
USPC ................................................ 118/308, 309
See application file for complete search history.

(56) References Cited

U.S. PATENT DOCUMENTS

| 6,503,026 | B1 | 1/2003 | Mitchell | |
|---|---|---|---|---|
| 2003/0057142 | A1* | 3/2003 | Pentz | E04F 21/085 |
| | | | | 209/615 |
| 2006/0163763 | A1* | 7/2006 | Fellinger | E04F 21/12 |
| | | | | 264/129 |
| 2019/0010642 | A1* | 1/2019 | Dovetta | D01G 9/08 |

FOREIGN PATENT DOCUMENTS

| WO | WO 03/027554 A2 | 4/2003 |
|---|---|---|
| WO | WO 2006/081137 A2 | 8/2006 |
| WO | WO 2017/115045 A1 | 7/2017 |

OTHER PUBLICATIONS

International Search Report as issued in International Patent Application No. PCT/FR2020/052551, dated Apr. 16, 2021.

\* cited by examiner

*Primary Examiner* — Yewebdar T Tadesse
(74) *Attorney, Agent, or Firm* — Pillsbury Winthrop Shaw Pittman LLP

(57) ABSTRACT

A device for preparing an insulation product based on wool, includes a chamber including an inlet opening through which a stream of carrier gas and a wool in the form of nodules or flakes are introduced, at least one system for generating a turbulent gas flow in the chamber, and an outlet opening through which flakes mixed with an outlet gas stream are expelled, wherein the device also includes at least one deflector element arranged in the chamber, creating a disruption that aerates the wool in the form of nodules or flakes.

19 Claims, 9 Drawing Sheets

[Fig 1]
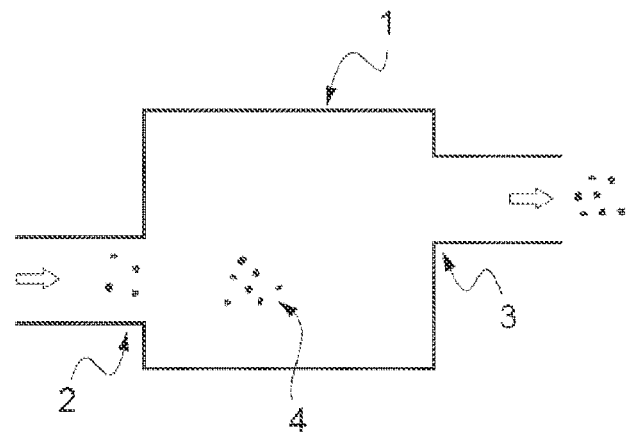
[Fig 2]
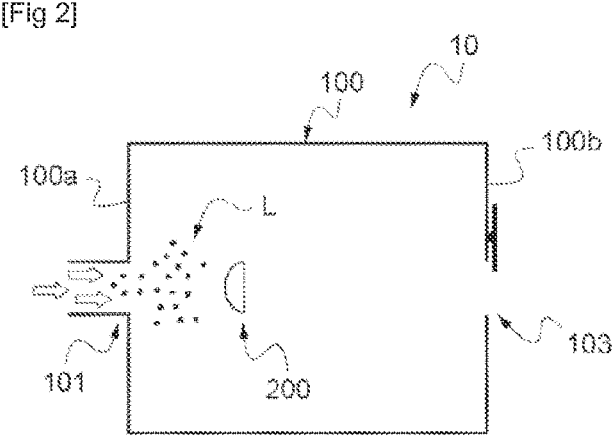
[Fig 3]
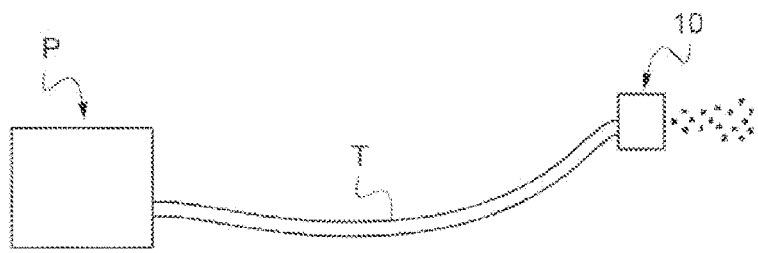

[Fig 4a]
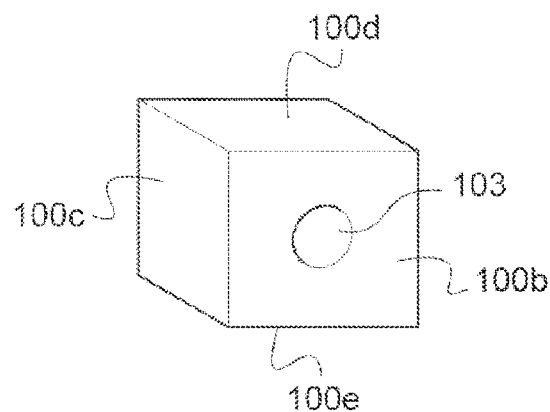
[Fig 4b]
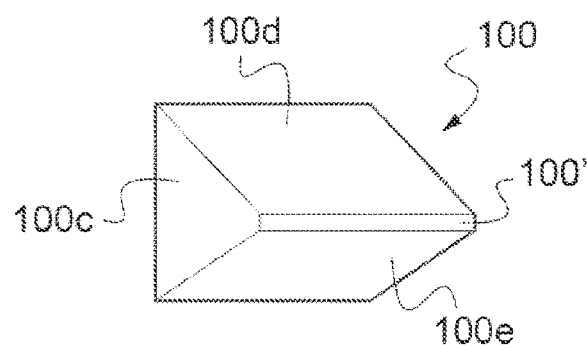
[Fig 4c]
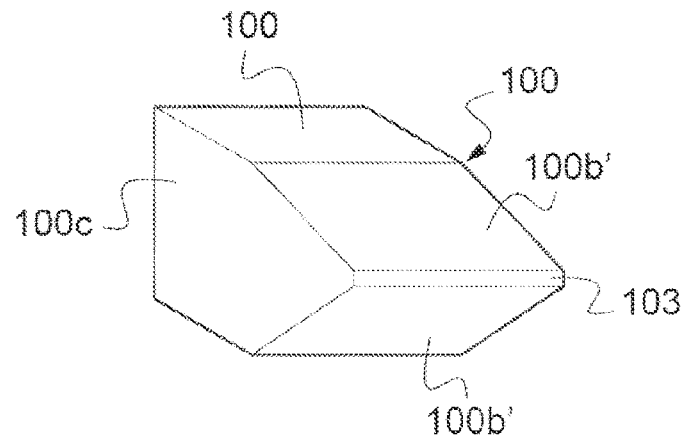

[Fig 5]
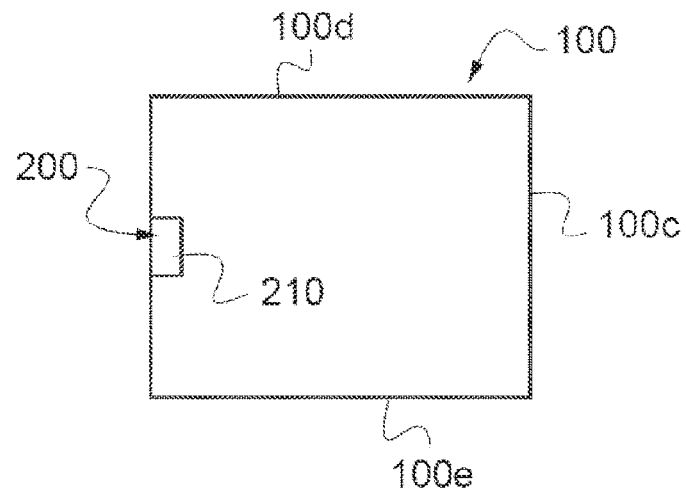
[Fig 6a]
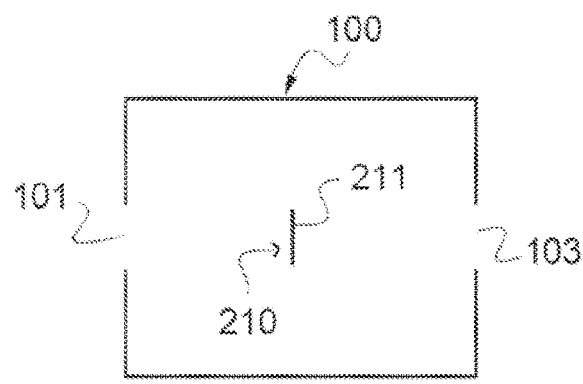
[Fig 6b]
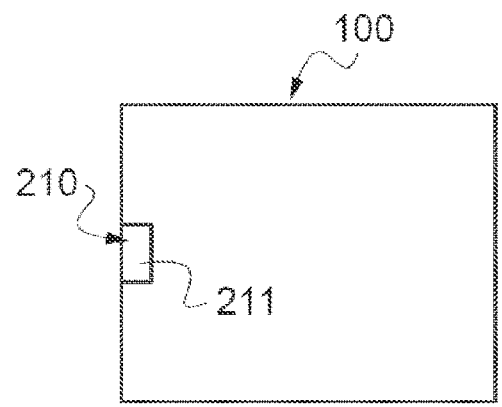

[Fig 7]
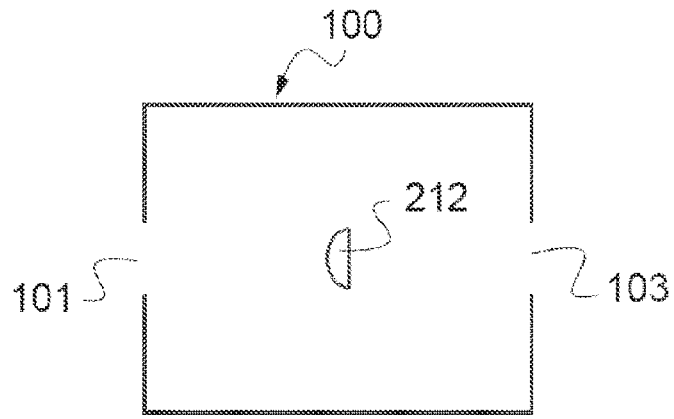
[Fig 8a]
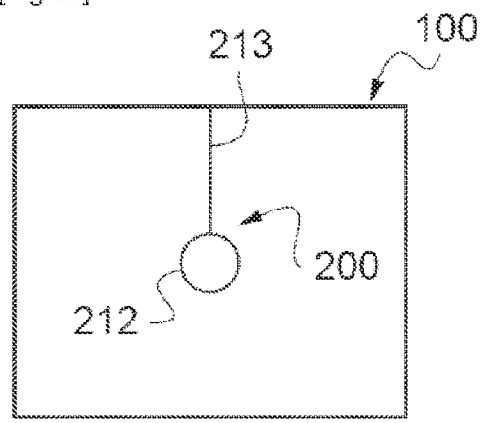
[Fig 8b]
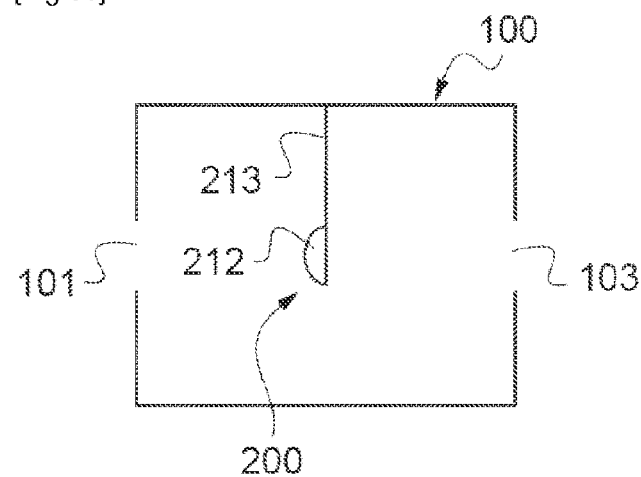

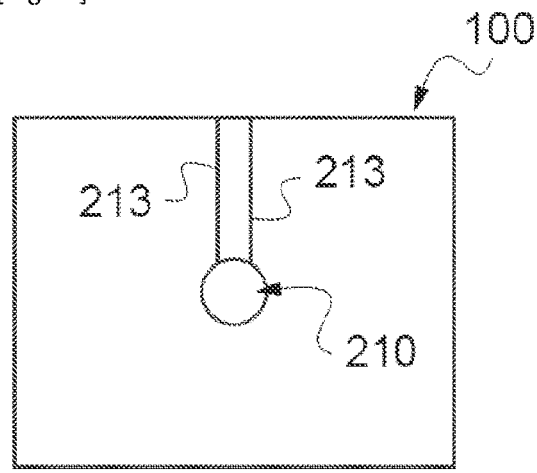
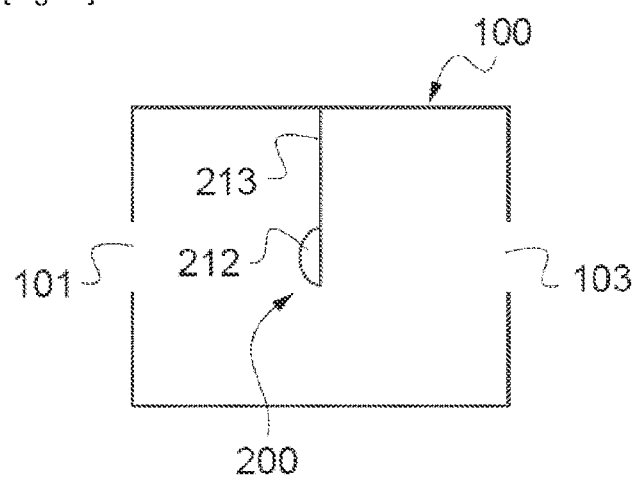
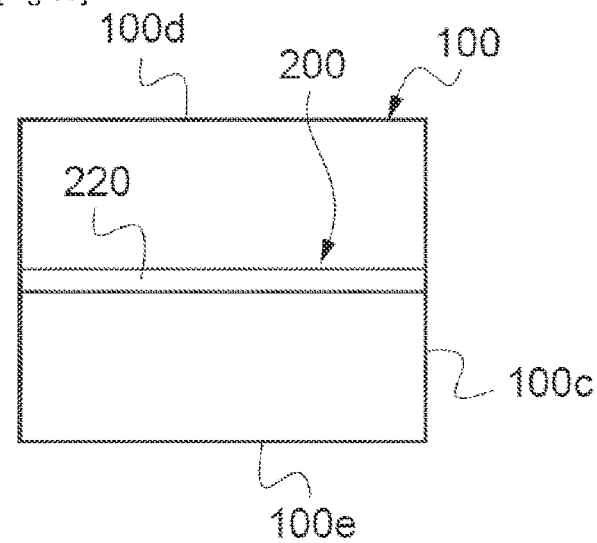

[Fig 9b]
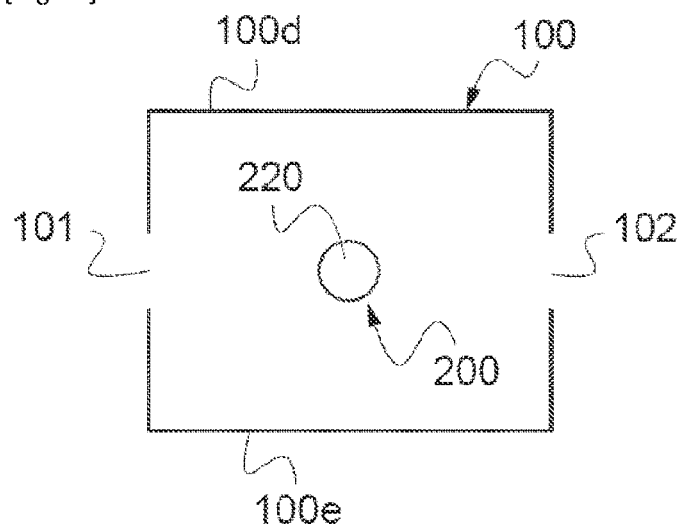
[Fig 10]
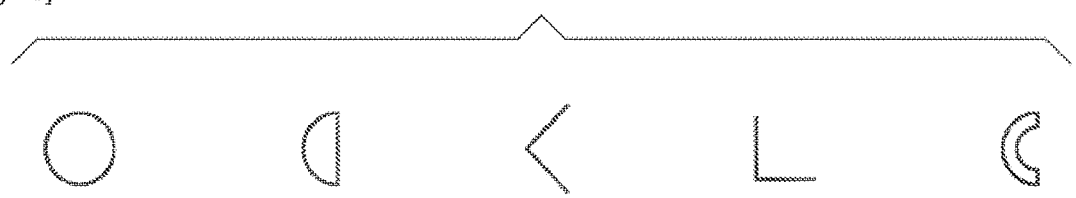
[Fig 11a]
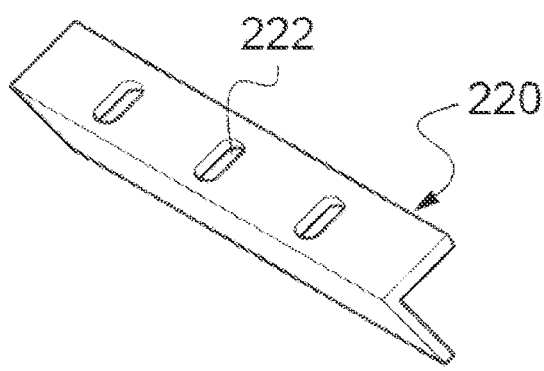

[Fig 11b]
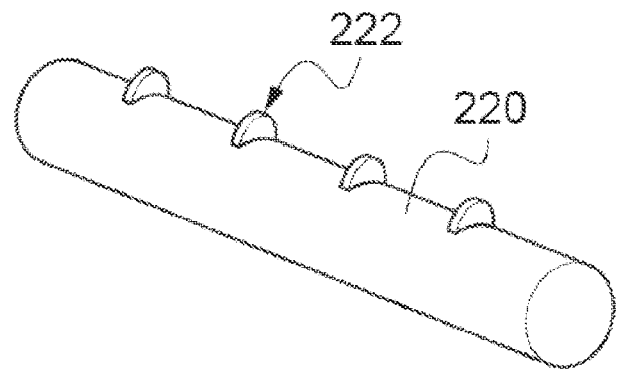
[Fig 12a]
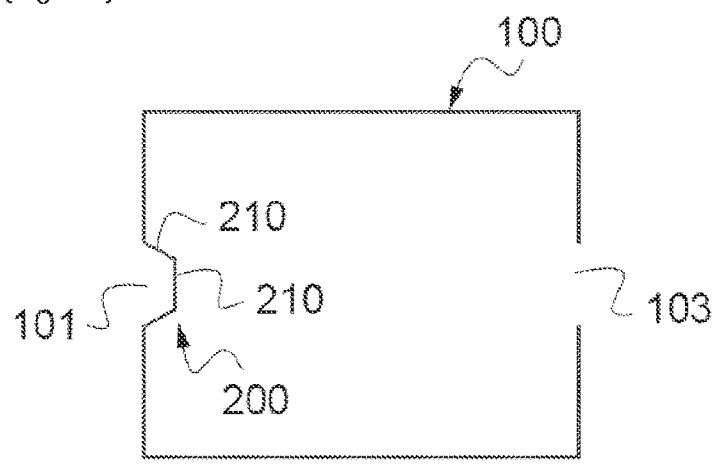
[Fig 12b]
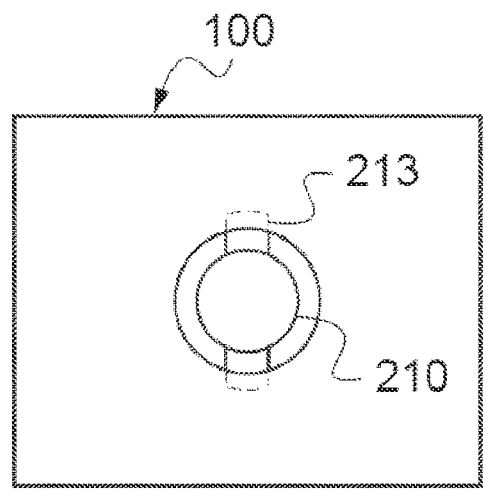

[Fig 13]
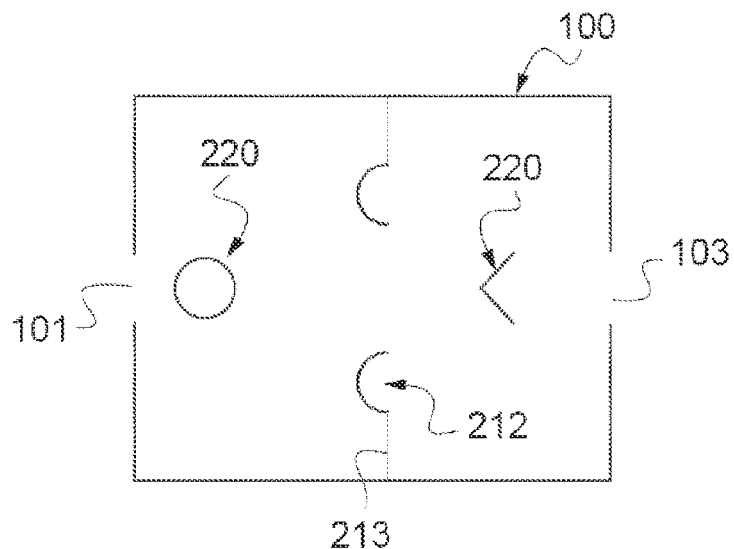
[Fig 14]
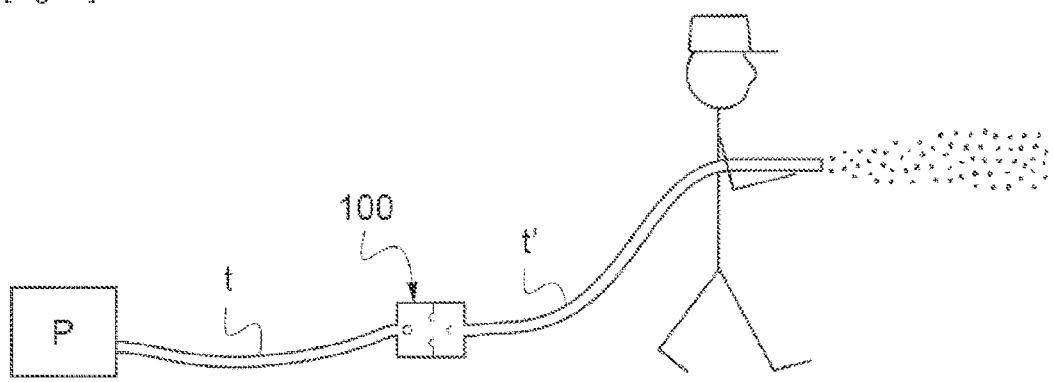
[Fig 15a]
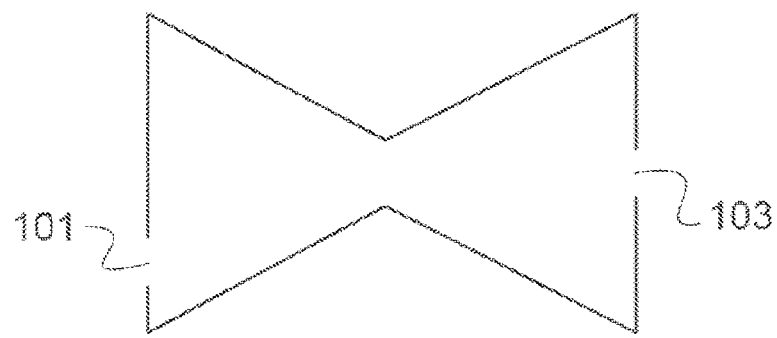

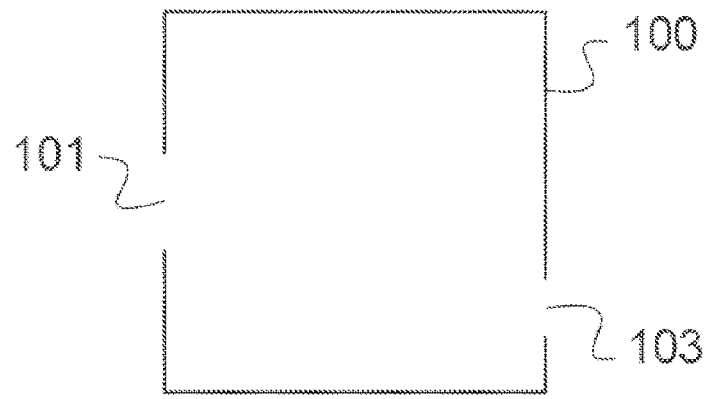
[Fig 15b]
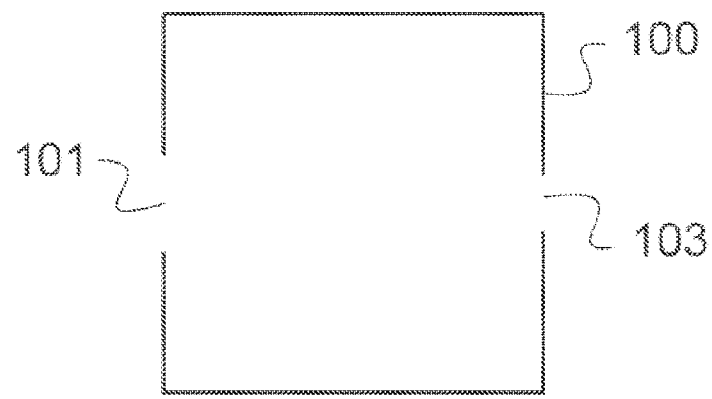
[Fig 15c]
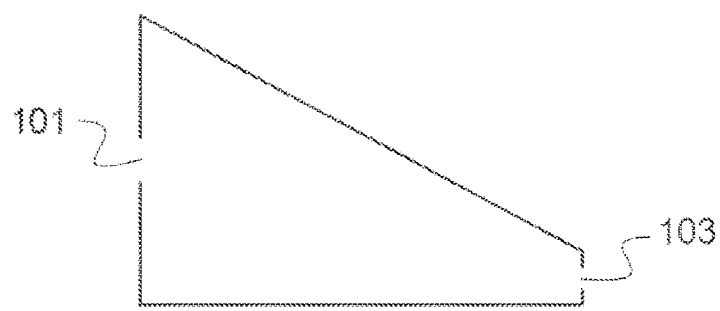
[Fig 15d]

DEVICE FOR PREPARING AN INSULATION PRODUCT MADE FROM WOOL, IN PARTICULAR MINERAL WOOL

CROSS-REFERENCE TO RELATED APPLICATIONS

This application is the U.S. National Stage of PCT/FR2020/052551, filed Dec. 18, 2020, which in turn claims priority to French patent application number 1915097 filed Dec. 20, 2019. The content of these applications are incorporated herein by reference in their entireties.

PRIOR ART

The invention relates to a device for aerating an insulation product.

Mineral wool is a very good thermal and acoustic insulator since it comprises entangled mineral fibers, giving it a porous and elastic structure. Such a structure makes it possible to trap air and absorb or attenuate noise. Moreover, mineral wool is manufactured mainly from mineral materials, in particular natural materials or recycled products (recycled glass), and thus exhibits an advantageous environmental balance. Lastly, since mineral wool is based on naturally noncombustible material, it does not feed fire and does not spread flames. Preferably, the mineral wool is chosen from glass wool or rock wool.

There exist products of the loose-fill type, which are in the form of small bundles of entangled fibers forming particles on a centimeter scale, in which no bonding agent ensures the cohesion of the fibers in the bundles.

The manufacture of loose-fill mineral wool has at least the following steps:
- a step of melting the raw materials such as glass in a melting furnace,
- a fiberizing step,
- a step of forming a mat of mineral wool,
- a step of nodulation by grinding.

The manufacture of loose-fill mineral wool may also comprise the following steps:
- a step of coating with agents such as antistatic agents and/or a cohesion additive, prior to, at the same time as, or following nodulation, and/or
- a bagging step.

At the end of the nodulation step, the mineral wool is in the form of nodules or flakes. The mineral wool can then be used as such as a loose-fill insulation product or loose-fill insulation by spreading it, blowing it or using it to fill cavities. Loose-fill insulation corresponds, in the building sector, to a variety of materials offered in the form of small particles, the texture of which varies from granular to flake-like.

Mineral wool is advantageously used in the form of nodules or flakes as a main constituent in loose-fill insulation products for spaces that are difficult to access such as the floors of attic spaces that have not been developed or are difficult to access.

These loose-fill insulation products are generally applied by mechanical blowing with the aid of a blowing machine that makes it possible to spray an insulation product over a surface or inject it into a cavity from an outlet pipe.

The loose-fill insulation products are therefore mostly installed by being sprayed directly into the space to be insulated such as attics or by being injected into a wall cavity.

The loose-fill insulation products are also known as blown insulation products.

The insulation product, once blown, needs to be as homogeneous as possible in order to avoid thermal bridging and thus to improve thermal performance. However, when the insulation product is blown, whatever the diameter of the outlet pipe, the mineral wool in the form of nodules or flakes is not entirely homogeneous. The thermal conductivity of the resulting insulation product is not optimized.

In this regard, there exist, as shown in FIG. 1, chambers 1 provided with an inlet opening 2 and an outlet opening 3 in which the flakes 4 are aerated for a predefined time before exiting.

However, these wool aeration chambers have the drawback of being voluminous in order to allow good aeration of the flakes of wool. However, a voluminous chamber becomes bulky and heavy, making it difficult to use.

SUMMARY OF THE INVENTION

The present invention seeks to solve the problems of aeration chambers known from the prior art by providing a chamber in which a turbulent stream is created for better aeration of the flakes.

To this end, the present invention relates to a device for preparing an insulation product based on wool, comprising a chamber comprising an inlet opening through which a stream of carrier gas and a wool in the form of nodules or flakes are introduced, the gas stream being subjected to turbulent flow in said chamber, and an outlet opening through which flakes mixed with an outlet gas stream are expelled, characterized in that said device also comprises means for deflecting the gas stream that make it possible to increase the residence time of the wool in the chamber, creating a disruption that aerates the wool in the form of nodules or flakes.

The present invention advantageously makes it possible to increase, via the deflector element, the disruptions created in said chamber. This increase in the disruptions makes it possible to better aerate the flakes of insulating wool so as to have a better performance. However, this also makes it possible to reduce the size of the chamber while retaining an identical performance. A more compact chamber then becomes easier to handle.

According to one example, the deflection means comprise at least one deflector element.

According to one example, said deflector element comprises a deflection surface extending from an interior wall of the chamber.

According to one example, said deflector element comprises a deflection surface and at least one arm connecting said deflection surface to an interior wall of the chamber.

According to one example, said deflection surface is a two-dimensional plate.

According to one example, said deflection surface is a three-dimensional part.

According to one example, said deflector element comprises a cross member arranged between two internal walls of said chamber.

According to one example, said cross member comprises irregularities and/or openings.

According to one example, said chamber comprises at least two deflector elements chosen at random.

According to one example, said deflection means comprise at least one partial misalignment of the main direction of the gas stream entering the chamber through the inlet opening and the outlet opening.

According to one example, the misalignment between the main direction of the gas stream entering the chamber through the inlet opening and the outlet opening is total.

According to one example, said deflection means comprise at least one obstacle created by the internal wall of said chamber.

According to one example, said chamber has a volume of between 5 and 90 dm3.

According to one example, the chamber is such that at least the area of the inlet opening differs from the area of the inlet face.

The invention also relates to a spray insulation system, comprising a means P for generating a gas stream connected to the device for preparing an insulation product based on wool according to the invention, said means P for generating a gas stream being able to supply a gas stream in which flakes of wool are mixed.

According to one example, said chamber is designed such that a second pipe can be connected to the outlet opening.

According to one example, the insulation product has a density of around 5 to 15 kg/m3 for products based on glass wool and of around 15 to 50 kg/m3 for products based on rock wool.

DESCRIPTION OF THE FIGURES

Further particular features and advantages will become clearly apparent from the following description thereof, which is given by way of entirely nonlimiting indication, with reference to the appended drawings, in which:

FIG. 1 is a schematic depiction of a device for preparing an insulation product based on wool according to the prior art;

FIGS. 2, 3 and 5 are schematic depictions of a device for preparing an insulation product based on wool according to the invention;

FIGS. 4a, 4b and 4c are schematic depictions of different shapes of a chamber of a device for preparing an insulation product based on wool according to the invention;

FIGS. 6a, 6b, 7, 8a to 8d are schematic depictions of a first embodiment of the device for preparing an insulation product based on wool according to the invention;

FIGS. 9a, 9b, 10 are schematic depictions of a second embodiment of the device for preparing an insulation product based on wool according to the invention;

FIGS. 11a, 11b are schematic depictions of a variant of the embodiments of the device for preparing an insulation product based on wool according to the invention;

FIGS. 12a, 12h and 13 are schematic depictions of embodiments of the device for preparing an insulation product based on wool according to the invention;

FIGS. 3 and 14 are schematic depictions of a spray insulation system according to the invention;

FIGS. 15a, 15b, 15c and 15d are schematic depictions of further means for increasing the residence time of the wool-type material according to the invention.

DETAILED DESCRIPTION OF THE INVENTION

FIGS. 2 and 3 show a device 10 for preparing an insulation product based on wool according to the invention. This device 10 comprises a chamber 100 comprising an inlet opening 101 and an outlet opening 103. A gas stream f is introduced into the chamber 100 via the inlet opening, this gas stream f being produced by a means P for generating a gas stream. The inlet opening 101 also allows the introduction of a wool L in the form of flakes or nodules into the chamber via means for introducing a wool in the form of flakes or nodules into the chamber. The wool in the form of flakes or nodules is a rock wool or a glass wool or a cellulose wool. These nodules or flakes of mineral wool have a length of between 0.05 and 5 cm, in particular between 0.1 and 1 cm. These flakes or nodules are formed of fibers that are entangled in the form of small bundles, small rovings, or "pilling". The wool and the gas stream are thus introduced into the chamber 100 via a pipe t, itself connected to the means P for generating a gas stream (compressor of the blowing machine), thereby forming a spray insulation system. The wool can be introduced into the gas stream in advance. The chamber 100 comprises, optionally; means for creating, within the chamber, an entrainment of the wool in one sense in a direction A and in the opposite sense in a direction B opposite to the direction A such that, within the chamber, there is at least one plane perpendicular to the direction A, where the wool entrained in the direction A crosses the wool entrained in the opposite sense in the direction B. The means for creating, within the chamber, an entrainment of the wool in one sense in a direction A and in the opposite sense in a direction B opposite to the direction A depend, for example, on the shape and the size of the chamber.

In any event, the gas steam is subjected to turbulent flow in said chamber 100.

As regards the chamber 100, the latter is designed such that the inlet opening 101 and the outlet opening 103 are arranged on opposite faces of the chamber. Thus, the inlet opening is arranged on an inlet face 100a while the outlet opening is arranged at an outlet face 100b. Preferably, the inlet opening 101 and the outlet opening 103 are opposite one another. The chamber is such that at least the area of the inlet opening differs from the area of the inlet face, meaning that the area of the inlet opening is smaller than the area of the inlet face. Preferably, the area of the inlet opening is equal to half the area of the inlet face, preferably to a third, a quarter or a fifth. Preferably, the area of the outlet opening also differs from the area of the outlet face. This chamber configuration allows the gas stream circulating therein to be disrupted. In the case of a chamber in which the inlet opening has the same area as the inlet face and the outlet opening has the same area as the outlet face, the entering gas stream is not subjected to turbulent flow for aerating the flakes of wool, the stream entering and then exiting without any residence time in said chamber.

Ira a first configuration, which can be seen in FIG. 4a, the chamber 100 also comprises at least two side faces 100c, an upper face 100d and a lower face 100e. In this first configuration, as seen from a side face, the chamber may thus have a square or rectangular or trapezoidal profile.

In a second configuration, which can be seen in FIG. 4b, the chamber 100 comprises at least two side faces 100c and an upper face 100d and a lower face 100e. The outlet face has been eliminated to the benefit of the upper face and the lower face. This is understood as meaning that the upper face 100d and the lower face 100e are arranged so as to make the outlet face useless. To this end, the upper face and the lower face are arranged such that the chamber, as seen from a side face, has a triangular profile, To this end, the upper face and the lower face converge toward one another. Such a triangular profile makes it possible to arrange the outlet opening at the junction between the upper face and the lower face.

In a third configuration, which can be seen in FIG. 4c, the chamber 100 comprises at least two side faces 100c, an upper face 100d and a lower face 100e. The outlet face 100b is divided into two parts 100b' that converge so as to locally/partially create a triangular profile. Such a triangular profile makes it possible to arrange the outlet opening 103 at the junction between the two parts that form the outlet face.

The chamber has dimensions that allow it to have a volume of, preferably, between 5 and 90 dm3.

The outlet opening 103 may have any shape, such as a circular shape 103a. Preferably, the outlet opening is in the form of a slot 103b. This slot extends horizontally with respect to the plane of the floor. This slot extends across part of or across the entire width of the chamber. This slot has a height of between 0.1 and 1 cm, preferably between 0.2 and 0.5 cm.

The advantage of a slot 103b is to allow the flakes to be expelled across a greater width and thus to make it possible to cover a larger area. The outlet stream of the flakes is such that the spraying speed is at least 15 m/s, for example around 20 m/s.

Cleverly, the chamber 100 comprises means for deflecting the stream entering said chamber. These deflection means are thus able to divert the gas stream entering. These deflection means are therefore means for lengthening the residence time of the wool, in the form of flakes or nodules, in said chamber.

According to a first solution, these deflection means, which make it possible to lengthen the residence time of the wool in the chamber, comprise at least one deflector element 200 that acts as a means for generating a turbulent gas stream. This deflector element 200 extends in said chamber 100. This means that said deflector element 200 extends from any interior wall of said chamber 100.

This deflector element 200 advantageously makes it possible to divert the gas stream entering and to create a disruption of the gas stream circulating in the chamber 100. These disruptions bring about recirculation points creating an instability that increases the level of turbulence and create the recirculation movements. These recirculation points are thus the location at which shear forces are present. The insulating material, such as flakes of wool, is subjected, by these shear forces, to significant mechanical stresses that contribute towards "aerating" the fibers. The passage through the recirculation zone makes it possible to considerably increase the time for which the mineral wool is subjected to significant stresses. This aeration of the flakes of insulating material makes it possible to significantly reduce the density of the wool or cellulose in the form of nodules or flakes, but especially to homogenize the structure thereof. Surprisingly, the expansion and/or the homogenization of the wool subjected to the aeration step of the invention is much better than that which can be obtained by known homogenization processes.

The improvement in thermal performance results in particular, compared with non-aerated mineral wools, in a decrease in thermal conductivity with the same density or in a decrease in density with the same thermal conductivity. The resulting insulation products also have, with the same density and thickness, much greater air resistance. The insulation products obtained after the aeration step have low densities, in particular of around 5 to 15 kg/m3 for products based on glass wool and around 15 to 50 kg/m3 for products based on rock wool.

A second advantage of the chamber according to the invention is that it makes it possible to optimize the size of the chamber. Specifically, a disruption of the gas stream causing the aeration of the flakes of wool made of insulating material is able to be obtained by the chamber per se. This means that the shape and dimensions of the chamber are such that recirculation points arise. However, the dimensions of the chamber condition the bulk or mass thereof. Thus, the fact that it is possible to create a disruption in a chamber with a deflector element makes it possible to design a chamber with smaller dimensions and thus a smaller bulk while having the same performance in terms of aeration of the wool.

In a first embodiment, which can be seen in FIG. 5, the deflector element 200 comprises a deflection surface 210 extending from an interior wall of the chamber 100. This deflection surface 210 is used to oppose the gas stream entering the chamber 100 and thus to create turbulence. This deflection surface may take on different forms.

In a first form, the deflection surface 210 is a two-dimensional plate 211, which is flat, as can be seen in FIGS. 6a and 6b, or said plate extends from a wall. This plate may have various shapes: circular, ovoid, square, rectangular, parallelepipedal, etc.

In a second form, which can be seen in FIG. 7, the deflection surface 210 is a three-dimensional part 212, This three-dimensional part 212 is a part that is conical, pyramid-shaped, parallelepipedal, truncated or not truncated, solid or partially hollowed out, i.e. having any shape that makes it possible to divert/disrupt the gas stream.

For these two forms, the deflection surface may extend directly from the interior wall of the chamber 100.

In a first variant, which can be seen in FIGS. 8a and 8b, said deflector element 200 also comprises at least one arm 213 arranged with one of its ends fixed to the interior wall of the chamber 100. This fixing may be effected by bonding or welding or screwing, or the arm is materially integral with said chamber. The second end of the arm is used to carry said deflection surface 210.

In the first form, the arm 213 supporting said deflection surface 211 is, preferably, fixed to said deflection surface 211 via the edge thereof.

In the second form, the arm 213 supporting said three-dimensional part 212 extends from one of the faces of this three-dimensional part 212.

Having an arm 213 provides more options for positioning said deflection surface 210 with respect to the gas stream. Thus, it is possible to position said deflection surface 210 more centrally in the chamber 100.

In an alternative of the first variant, which can be seen in FIGS. 8c and 8d, the deflector element 200 comprises a second arm 213. This second arm may be arranged in various ways. Thus, it will be understood that the second arm 213 may extend from the deflection surface 210 parallel to the first arm or from an opposite side. Having the arms 213 extending in opposite directions has the advantage of reducing the risks of deformation thereof under the effect of the gas stream causing a modification to the disruption.

In a second embodiment, which can be seen in FIGS. 9a and 9b, the deflector element 210 comprises a cross member 220 arranged between two walls of the chamber. FIG. 9a shows the cross member 210 from the inlet face or the outlet face.

This cross member 220 may be in the form of a, solid or hollow, cylinder, of a half cylinder that is or is not partially hollowed out, of an L-shaped or V-shaped profile. The cross member 220 may thus have any of the shapes that allow it to disrupt the gas stream, as can be seen in FIG. 10.

In a variant of the two embodiments, which can be seen in FIGS. 11a and 11b, irregularities 222 such as through-cavities or blind cavities or protuberances are arranged at the deflector element 210. These irregularities advantageously make it possible to disrupt the gas stream.

In an embodiment that can be seen in FIGS. 12a and 12b, the chamber comprises a deflector element 200. FIG. 12a shows a view from the upper wall. This deflector element as described in the two embodiments is arranged facing the inlet opening of the chamber.

Cleverly, the type of deflector element 210 used is dependent on the inlet opening 101. Specifically, if the inlet opening 101 has a circular shape or the like, a deflector element as described in the first embodiment is used. In the case of an opening 101 in the form of a slot, a deflector element 210 according to the second embodiment is used.

Specifically, this cleverness makes it possible to use the deflector element of which the shape most closely resembles that of the inlet opening: deflector element in the form of a cross member for an inlet opening in the form of a slot. Therefore, a deflector is used of which the shape is a homothetic transformation of the shape of the inlet opening. This means that the apparent area of the deflector, that is to say the area of the deflector projected onto a plane parallel to that of the inlet face is substantially identical, and preferably identical to the area of the inlet opening.

In this case, the deflector element is arranged so as to face the inlet opening in order to maximize the performance thereof. Nevertheless, even if the deflector element does not have a shape that is a homothetic transformation of the inlet opening, it is advantageous to position it facing the inlet opening.

In a variant of this embodiment, the chamber 100 is provided with at least two deflector elements 210. This multiplication of deflector elements makes it possible to ensure turbulence of the gas stream in said chamber.

In this variant, it is thus possible to mix different types of deflector elements, as can be seen in FIG. 13.

According to a second solution, the deflection means, for increasing the residence time of the wool in the chamber, are a particular arrangement of the chamber. In this second solution, the increase in the residence time of the wool is effected by the chamber itself. Specifically, it is possible to increase the residence time of the flakes by disrupting the entering stream. This disruption of the stream is the result of the presence of (an) obstacle(s) on the path of the gas stream entering said chamber. This or these obstacles have various origins.

According to a first origin, the obstacles to the entering gas stream result from the shape of the chamber that can be seen in FIGS. 15a and 15d. The chamber has a shape such that at least one wall of said chamber partially faces the entering gas stream. This wall partially facing the entering gas stream makes it possible to disrupt the stream by diverting it at least partially in a different direction.

According to a second origin, the obstacles for increasing the residence time of the flakes in the chamber are the consequence of a misalignment between the inlet opening and the outlet opening in FIGS. 15b and 15d. Such a misalignment makes it possible to create a natural obstacle to the entering gas stream carrying the flakes, the entering gas stream striking the interior wall of the chamber. This causes dispersion of the gas stream and therefore disruption.

The misalignment necessary to allow the creation of disruption for increasing the residence time of the flakes in the chamber is such that it is necessary, at least, for the outlet opening not to be entirely opposite the gas stream entering through the inlet opening. This means that the entering gas stream is propelled in a main direction in which it is intense and secondary directions in which the intensity is lower. Thus, the outlet opening is positioned so as not to be entirely opposite the main direction of the entering gas stream, a partial overlap being possible. Preferably, the outlet opening is positioned such that there is no overlap between the inlet opening and the outlet opening.

It is also possible to have the deflection and the increase in the residence time of the material in the chamber as a result of a difference in size between the outlet opening and the inlet opening, the outlet opening being smaller than the inlet opening, as can be seen in FIG. 15c. Specifically, having an outlet opening that is smaller has the consequences that the entering stream comes at least partially into contact with the interior wall of the chamber, causing a diversion of this stream and therefore disruptions.

In a variant of the invention, the chamber according to the invention is not used as an end fitting, that is to say as the element through which the insulating product is sprayed towards the zone to be insulated. In this regard, the chamber may be used as an intermediate element in the spray insulation system. For this purpose, the outlet opening 103 is designed, equipped to have a second pipe t' connected to it. This variant advantageously makes it possible to have the chamber resting on the ground and for the operator to handle only the pipe t', as can be seen in FIG. 14.

Of course, the present invention is not limited to the example illustrated, but can be varied and modified in various ways that will be apparent to a person skilled in the art.

The invention claimed is:

1. A device for preparing an insulation product based on wool, comprising a chamber comprising an inlet opening through which a stream of carrier gas and a wool in the form of nodules or flakes are introduced, the gas stream being subjected to turbulent flow in said chamber, and an outlet opening through which flakes mixed with an outlet gas stream are expelled, and a deflection system configured to deflect the gas stream thereby enabling an increase in a residence time of the wool in the chamber, creating a disruption that aerates the wool in the form of nodules or flakes, said deflection means comprising at least one deflector element arranged in said chamber, the at least one deflector element extending from an interior wall of the chamber wherein said at least one deflector element comprises a deflection surface and at least one arm connecting said deflection surface to an interior wall of the chamber.

2. The device as claimed in claim 1, wherein said at least one deflector element comprises a deflection surface extending from an interior wall of the chamber.

3. The device as claimed in claim 2, wherein said deflection surface is a two-dimensional plate.

4. The device as claimed in claim 2, wherein said deflection surface is a three-dimensional part.

5. The device as claimed in claim 1, wherein said at least one deflector element comprises a cross member arranged between two internal walls of said chamber.

6. The device as claimed in claim 5, wherein said cross member comprises irregularities and/or openings.

7. The device as claimed in claim 1, wherein said deflection system comprises at least one partial misalignment of the main direction of the gas stream entering the chamber through the inlet opening and the outlet opening.

8. The device as claimed in claim 7, wherein the at least one partial misalignment between the main direction of the gas stream entering the chamber through the inlet opening and the outlet opening is total.

9. The device as claimed in claim 1, wherein said deflection system comprises at least one obstacle created by an internal wall of said chamber.

10. The device as claimed in claim 1, wherein the chamber comprises an inlet face for the inlet opening, an outlet face for the outlet opening, two side faces, an upper face and a lower face.

11. The device as claimed in claim 10, wherein the chamber is such that at least an area of the inlet opening differs from an area of the inlet face.

12. The device as claimed in claim 1, wherein the chamber comprises an inlet face for the inlet opening, two side faces, an upper face and a lower face, said upper face and said lower face being designed to converge toward one another while leaving a space acting as the outlet opening.

13. The device as claimed in claim 1, wherein said chamber has a volume of between 5 and 90 dm3.

14. A spray insulation system, comprising a gas generator for generating a gas stream connected to the device for preparing an insulation product based on wool as claimed in claim 1, said gas generator for generating a gas stream being able to supply a gas stream in which flakes of wool are mixed.

15. The system as claimed in claim 14, wherein said chamber is designed such that a second pipe is connectable to the outlet opening.

16. The spray insulation system as claimed in claim 14, wherein the insulation product has a density of around 5 to 15 kg/m3 for products based on glass wool and of around 15 to 50 kg/m3 for products based on rock wool.

17. A device for preparing an insulation product based on wool, comprising a chamber comprising an inlet opening through which a stream of carrier gas and a wool in the form of nodules or flakes are introduced, the gas stream being subjected to turbulent flow in said chamber, and an outlet opening through which flakes mixed with an outlet gas stream are expelled, and a deflection system comprising a deflector element arranged in said chamber and configured to deflect the gas stream thereby enabling an increase in a residence time of the wool in the chamber, creating a disruption that aerates the wool in the form of nodules or flakes wherein said deflector element comprises a deflection surface and at least one arm connecting said deflection surface to an interior wall of the chamber.

18. A device for preparing an insulation product based on wool, comprising a chamber comprising an inlet opening through which a stream of carrier gas and a wool in the form of nodules or flakes are introduced, the gas stream being subjected to turbulent flow in said chamber, and an outlet opening through which flakes mixed with an outlet gas stream are expelled, and a deflection system configured to deflect the gas stream thereby enabling an increase in a residence time of the wool in the chamber, creating a disruption that aerates the wool in the form of nodules or flakes wherein said chamber comprises at least two deflector elements chosen at random.

19. A device for preparing an insulation product based on wool, comprising a chamber comprising an inlet opening through which a stream of carrier gas and a wool in the form of nodules or flakes are introduced, the gas stream being subjected to turbulent flow in said chamber, and an outlet opening through which flakes mixed with an outlet gas stream are expelled, and a deflection system configured to deflect the gas stream thereby enabling an increase in a residence time of the wool in the chamber, creating a disruption that aerates the wool in the form of nodules or flakes, said deflection system comprising at least one deflector element arranged in said chamber, the deflector element comprising a deflection surface extending from an interior wall of the chamber, and said chamber comprising at least two deflector elements chosen at random.

* * * * *